(12) United States Patent
Li et al.

(10) Patent No.: US 11,122,555 B2
(45) Date of Patent: Sep. 14, 2021

(54) DATA TRANSMISSION METHOD, TERMINAL DEVICE, AND BASE STATION SYSTEM

(71) Applicant: HUAWEI TECHNOLOGIES CO., LTD., Guangdong (CN)

(72) Inventors: Junchao Li, Shanghai (CN); Haibao Ren, Shanghai (CN); Hao Tang, Shanghai (CN); Zhenfei Tang, Ottawa (CA); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 16/580,700

(22) Filed: Sep. 24, 2019

(65) Prior Publication Data

US 2020/0022121 A1  Jan. 16, 2020

Related U.S. Application Data

(63) Continuation of application No. PCT/CN2018/079892, filed on Mar. 21, 2018.

(30) Foreign Application Priority Data

Mar. 24, 2017  (CN) .......................... 201710184941.9

(51) Int. Cl.
*H04W 4/00* (2018.01)
*H04W 72/04* (2009.01)
*H04L 5/00* (2006.01)

(52) U.S. Cl.
CPC ......... *H04W 72/042* (2013.01); *H04L 5/0048* (2013.01); *H04W 72/0466* (2013.01)

(58) Field of Classification Search
None
See application file for complete search history.

(56) References Cited

U.S. PATENT DOCUMENTS

2009/0088148 A1  4/2009  Chung et al.
2011/0274066 A1  11/2011  Tee et al.
(Continued)

FOREIGN PATENT DOCUMENTS

CN    101809898 A    8/2010
CN    102111884 A    6/2011
(Continued)

OTHER PUBLICATIONS

3GPP TS 36.211 V14.2.0 (Mar. 2017), 3rd Generation Partnership Project, Technical Specification Group Radio Access Network Evolved Universal Terrestrial Radio Access (E-UTRA), Physical channels and modulation(Release 14), 197 pages.
(Continued)

*Primary Examiner* — Clemence S Han
(74) *Attorney, Agent, or Firm* — Fish & Richardson P.C.

(57) ABSTRACT

The present disclosure relates to data transmission methods, terminal devices, and base station systems. In one example method, a base station sends information about a first control resource set and information about a second control resource set to a terminal device. The terminal device detects first control information in a first control channel candidate set, and detects second control information in a second control channel candidate set.

17 Claims, 9 Drawing Sheets

(56) References Cited

U.S. PATENT DOCUMENTS

| | | | |
|---|---|---|---|
| 2014/0092836 A1* | 4/2014 | Park | H04W 72/042 |
| | | | 370/329 |
| 2014/0112268 A1 | 4/2014 | Mu et al. | |
| 2014/0140310 A1* | 5/2014 | Liu | H04L 5/0053 |
| | | | 370/329 |
| 2014/0241310 A1 | 8/2014 | Guan | |
| 2015/0257086 A1 | 9/2015 | Jiang et al. | |
| 2015/0358124 A1* | 12/2015 | Suzuki | H04L 5/0053 |
| | | | 370/329 |
| 2018/0146455 A1* | 5/2018 | Takeda | H04L 5/0055 |

FOREIGN PATENT DOCUMENTS

| | | | |
|---|---|---|---|
| CN | 102265677 A | 11/2011 | |
| CN | 102792601 A | 11/2012 | |
| CN | 103532688 A | 1/2014 | |
| CN | 103716121 A | 4/2014 | |
| CN | 103781177 A | 5/2014 | |
| CN | 104869578 A | 8/2015 | |
| CN | 105391517 A | 3/2016 | |
| CN | 105846983 A | 8/2016 | |
| EP | 2950600 A1 | 12/2015 | |
| EP | 2524436 B1 | 10/2019 | |
| WO | 2014115781 A1 | 7/2014 | |
| WO | 2016163507 A1 | 10/2016 | |
| WO | 2017025484 A1 | 2/2017 | |

OTHER PUBLICATIONS

3GPP TS 36.213 V142.0 (Mar. 2017), 3rd Generation Partnership Project, Technical Specification Group Radio Access Network, Evolved Universal Terrestrial Radio Access (E-UTRA), Physical layer procedures(Release 14), 454 pages.

MCC Support,"Final Report of 3GPP TSG RAN WG1 #87 v1.0.0,(Reno, USA, Nov. 14-18, 2016)",3GPP TSG RAN WG1 Meeting #88 R1-1701552, Athens, Greece,dated Feb. 13-17, 2017, 157 pages.

MCC Support,"Final Report of 3GPP TSG RAN WG1 #AH1_NR v1.0.0(Spokane, USA, Jan. 16-20, 2017)",3GPP TSG RAN WG1 Meeting #88 R1-1701553, Athens, Greece, dated Feb. 13-17, 2017,106 pages.

PCT International Search Report in International Application No. PCT/CN2018/079,892, dated Jun. 8, 2018, 6 pages (With English Translation).

Extended European Search Report issued in European Application No. 18770577.7 dated Feb. 10, 2020, 10 pages.

Office Action issued in Chinese Application No. 201710184941.9 dated Dec. 4, 2019, 29 pages (With English Translation).

Office Action issued in Chinese Application No. 201710184941.9 dated Dec. 3, 2020, 6 pages.

* cited by examiner

DATA TRANSMISSION METHOD, TERMINAL DEVICE, AND BASE STATION SYSTEM

CROSS-REFERENCE TO RELATED APPLICATIONS

This application is a continuation of International Application No. PCT/CN2018/079892, filed on Mar. 21, 2018, which claims priority to Chinese Patent Application No. 201710184941.9, filed on Mar. 24, 2017. The disclosures of the aforementioned applications are hereby incorporated by reference in their entireties.

TECHNICAL FIELD

This application relates to the field of technologies, and in particular, to a data transmission method, a terminal device, and a base station system.

BACKGROUND

In new radio (NR), a cell may configure one or more control resource sets (CORESET) for each user equipment (UE), and one CORESET is defined as several physical resource blocks (PRB) in frequency domain. The UE monitors the one or more configured CORESETs, and blindly detects a downlink control channel in the CORESETs.

There is a similar concept in long term evolution (LTE). To be specific, a cell may configure, for UE, one or two enhanced physical downlink control channel (EPDCCH) sets that need to be monitored, and an EPDCCH can be transmitted in only these sets. One EPDCCH set includes two, four, or eight PRB pairs. Different quantities of PRB pairs may be configured for different EPDCCH sets.

In LTE, when a base station sends, to the UE, downlink control information (DCI) corresponding to two EPDCCH sets, the UE blindly detects two pieces of DCI in a first EPDCCH set. When one of the two pieces of DCI is not detected in the first EPDCCH set, or neither of the two pieces of DCI is detected, the UE blindly detects the undetected DCI in a second EPDCCH set. Therefore, to reduce a quantity of blind detection times, a same payload size is set for the downlink control information corresponding to the two EPDCCH sets in LTE.

In NR, in a multipoint transmission scenario, how to exchange control information between a base station and a terminal device is a problem to be resolved.

SUMMARY

This application provides a data transmission method, a terminal device, a base station, and a base station system, to provide a method for transmitting and detecting control information in NR.

According to a first aspect, this application provides a data transmission method, and the method includes:

receiving, by a terminal device, first configuration information and second configuration information from a base station, where the first configuration information includes information about a first control resource set, and the second configuration information includes information about a second control resource set;

detecting, by the terminal device, first control information in a first control channel candidate set corresponding to the first control resource set; and detecting, by the terminal device, second control information in a second control channel candidate set corresponding to the second control resource set.

Optionally, a sum of a size of the first control channel candidate set and a size of the second control channel candidate set is not greater than a first threshold.

In the foregoing solution, the base station sends the first configuration information and the second configuration information to the terminal device, the first configuration information includes the information about the first control resource set, the second configuration information includes the information about the second control resource set, and the sum of the size of the first control channel candidate set and the size of the second control channel candidate set is not greater than the first threshold. The terminal device needs to detect the first control information in only the first control channel candidate set corresponding to the first control resource set, and detect the second control information in only the second control channel candidate set corresponding to the second control resource set. However, in an LTE system, when a first control resource set and a second control resource set are configured for a terminal device, because the terminal device does not know a specific control resource set in which first control information and second control information are sent to the terminal device, the terminal device needs to detect the first control information and the second control information in the first control resource set, and when the first control information or the second control information is not detected in the first control resource set, detect the second control information or the first control information in the second control resource set. Therefore, to reduce a quantity of blind detection times, a same payload size is set for downlink control information corresponding to two EPDCCH sets in LTE. In this application, the terminal device needs to detect the first control information in only the first control channel candidate set, and detect the second control information in only the second control channel candidate set. Therefore, in this application, a quantity of blind detection times does not increase even if a payload size of the first control information is different from that of the second control information.

With reference to the first aspect, in a first possible implementation of the first aspect, a payload length of the first control information is different from that of the second control information.

In this embodiment of this application, a quantity of blind detection times of the terminal device does not increase even if the payload length of the first control information is different from that of the second control information, and therefore, the quantity of blind detection times is better controlled.

With reference to the first aspect or the first possible implementation of the first aspect, in a second possible implementation of the first aspect, the first configuration information further includes first transmission mode information associated with the first control information, and the second configuration information further includes second transmission mode information associated with the second control information; or before the detecting, by the terminal device, first control information in a first control channel candidate set corresponding to the first control resource set, the method further includes:

receiving, by the terminal device, third configuration information from the base station, where the third configuration information includes first transmission mode information associated with the first control information and second transmission mode information associated with the second control information.

With reference to the second possible implementation of the first aspect, in a third possible implementation of the first aspect, the first transmission mode information is a transmission mode, or the first transmission mode information is one or more of a resource mapping manner, a demodulation reference signal DMRS scrambling code sequence, and quasi co-location QCL.

With reference to the second possible implementation of the first aspect or the third possible implementation of the first aspect, in a fourth possible implementation of the first aspect, the second transmission mode information is a transmission mode; or the second transmission mode information is one or more of a resource mapping manner, a DMRS scrambling code sequence, and QCL.

With reference to the first aspect or the first possible implementation of the first aspect to the fourth possible implementation of the first aspect, in a fifth possible implementation of the first aspect, the first control resource set and the second control resource set belong to different carriers.

In this embodiment of this application, when the first control resource set and the second control resource set belong to the different carriers, the data transmission method provided in this application for reducing a quantity of blind detection times of a terminal device is also applicable.

According to a second aspect, this application provides a terminal device. In a possible design, the terminal device includes a plurality of functional modules, configured to implement any data transmission method provided in the first aspect, so that the terminal device receives first configuration information and second configuration information sent by a base station. The first configuration information includes information about a first control resource set, the second configuration information includes information about a second control resource set, and a sum of a size of a first control channel candidate set and a size of a second control channel candidate set is not greater than a first threshold. The terminal device needs to detect first control information in only the first control channel candidate set corresponding to the first control resource set, and detect second control information in only the second control channel candidate set corresponding to the second control resource set. However, in an LTE system, when a first control resource set and a second control resource set are configured for a terminal device, because the terminal device does not know a specific control resource set in which first control information and second control information are sent to the terminal device, the terminal device needs to detect the first control information and the second control information in the first control resource set, and when the first control information or the second control information is not detected in the first control resource set, detect the second control information or the first control information in the second control resource set. Therefore, to reduce a quantity of blind detection times, a same payload size is set for downlink control information corresponding to two EPDCCH sets in LTE. In this application, the terminal device needs to detect the first control information in only the first control channel candidate set, and detect the second control information in only the second control channel candidate set. Therefore, in this application, a quantity of blind detection times does not increase even if a payload size of the first control information is different from that of the second control information.

In a possible design, a structure of the terminal device includes a processor and a transceiver. The processor is configured to support the terminal device in performing corresponding functions in the data transmission method in the first aspect. The transceiver is configured to: support communication between the terminal device and the base station, and receive information or an instruction that is related to the foregoing data transmission method and that is sent by the base station. The terminal device may further include a memory. The memory is coupled to the processor, and the memory stores a program instruction and data that are necessary for the terminal device.

The transceiver is configured to receive first configuration information and second configuration information from the base station, where the first configuration information includes information about a first control resource set, and the second configuration information includes information about a second control resource set.

The processor is configured to: detect first control information in a first control channel candidate set corresponding to the first control resource set, and detect second control information in a second control channel candidate set corresponding to the second control resource set, where a sum of a size of the first control channel candidate set and a size of the second control channel candidate set is not greater than a first threshold.

Optionally, a payload length of the first control information is different from that of the second control information.

Optionally, the first configuration information further includes first transmission mode information associated with the first control information, and the second configuration information further includes second transmission mode information associated with the second control information; or the transceiver is further configured to receive third configuration information from the base station, where the third configuration information includes first transmission mode information associated with the first control information and second transmission mode information associated with the second control information.

Optionally, the first transmission mode information is a transmission mode; or the first transmission mode information is one or more of a resource mapping manner, a demodulation reference signal DMRS scrambling code sequence, and quasi co-location QCL.

Optionally, the second transmission mode information is a transmission mode; or the second transmission mode information is one or more of a resource mapping manner, a DMRS scrambling code sequence, and QCL.

Optionally, the first control resource set and the second control resource set belong to different carriers.

According to a third aspect, this application provides a data transmission method, and the method includes:

receiving, by a terminal device, first configuration information and second configuration information from a base station, where the first configuration information includes information about a first control resource set, and the second configuration information includes information about a second control resource set;

detecting, by the terminal device, first control information and second control information in a first control channel candidate set corresponding to the first control resource set; and if the terminal device successfully detects the first control information, detecting, by the terminal device, the second control information in a second control channel candidate set corresponding to the second control resource set; or if the terminal device successfully detects the second control information, detecting, by the terminal device, the first control information in the second control channel candidate set, where a sum of a size of the first control channel candidate set and a size of the second control channel candidate set is not greater than a first threshold.

This application provides the data transmission method. Based on the method in this application, the base station sends only one piece of control information in a control channel candidate set corresponding to one control resource set, for example, sends the first control information in the first control channel candidate set, and sends the second control information in the second control channel candidate set, or sends the second control information in the first control channel candidate set, and sends the first control information in the second control channel candidate set. Therefore, the terminal device detects the first control information and the second control information in the first control channel candidate set. If the first control information is successfully detected in the first control channel candidate set, the terminal device needs to detect only the second control information in the second control channel candidate set. If the second control information is successfully detected in the first control channel candidate set, the terminal device needs to detect only the first control information in the second control channel candidate set.

With reference to the third aspect, in a first possible implementation of the third aspect, a payload length of the first control information is the same as that of the second control information.

With reference to the third aspect or the first possible implementation of the third aspect, in a second possible implementation of the third aspect, the first control resource set and the second control resource set belong to different carriers.

According to a fourth aspect, this application provides a terminal device. In a possible design, the terminal device includes a plurality of functional modules, configured to implement any data transmission method provided in the third aspect. A base station sends only one piece of control information in a control channel candidate set corresponding to one control resource set, for example, sends first control information in a first control channel candidate set, and sends second control information in a second control channel candidate set, or sends second control information in a first control channel candidate set, and sends first control information in a second control channel candidate set. Therefore, the terminal device detects the first control information and the second control information in the first control channel candidate set. If the first control information is successfully detected in the first control channel candidate set, the terminal device needs to detect only the second control information in the second control channel candidate set. If the second control information is successfully detected in the first control channel candidate set, the terminal device needs to detect only the first control information in the second control channel candidate set.

In a possible design, a structure of the terminal device includes a processor and a transceiver. The processor is configured to support the terminal device in performing corresponding functions in the data transmission method in the third aspect. The transceiver is configured to: support communication between the terminal device and the base station, and receive information or an instruction that is related to the foregoing data transmission method and that is sent by the base station. The terminal device may further include a memory. The memory is coupled to the processor, and the memory stores a program instruction and data that are necessary for the terminal device.

The transceiver is configured to receive first configuration information and second configuration information from the base station, where the first configuration information includes information about a first control resource set, and the second configuration information includes information about a second control resource set.

The processor is configured to: detect the first control information and the second control information in the first control channel candidate set corresponding to the first control resource set; and if the first control information is successfully detected, detect the second control information in the second control channel candidate set corresponding to the second control resource set; or if the second control information is successfully detected, detect the first control information in the second control channel candidate set, where a sum of a size of the first control channel candidate set and a size of the second control channel candidate set is not greater than a first threshold.

Optionally, a payload length of the first control information is the same as that of the second control information.

Optionally, the first control resource set and the second control resource set belong to different carriers.

According to a fifth aspect, this application provides a data transmission method, including:

sending, by a first base station, first configuration information and second configuration information to a terminal device, where the first configuration information includes information about a first control resource set, and the second configuration information includes information about a second control resource set;

sending, by the first base station, first control information to the terminal device in a first control channel candidate set corresponding to the first control resource set; and sending, by a second base station, second control information to the terminal device in a second control channel candidate set corresponding to the second control resource set, where a sum of a size of the first control channel candidate set and a size of the second control channel candidate set is not greater than a first threshold.

With reference to the fifth aspect, in a first possible implementation of the fifth aspect, the first configuration information further includes first transmission mode information associated with the first control information, and the second configuration information further includes second transmission mode information associated with the second control information; or the method further includes: sending, by the first base station, third configuration information to the terminal device, where the third configuration information includes first transmission mode information associated with the first control information and second transmission mode information associated with the second control information.

With reference to the first possible implementation of the fifth aspect, in a second possible implementation of the fifth aspect, the first transmission mode information is a transmission mode; or the first transmission mode information is one or more of a resource mapping manner, a DMRS scrambling code sequence, and QCL.

With reference to the first possible implementation of the fifth aspect or the second possible implementation of the fifth aspect, in a third possible implementation of the fifth aspect, the second transmission mode information is a transmission mode; or the second transmission mode information is one or more of a resource mapping manner, a DMRS scrambling code sequence, and QCL.

With reference to the fifth aspect or the first possible implementation of the fifth aspect to the third possible implementation of the fifth aspect, in a fourth possible implementation of the fifth aspect, the first control resource set and the second control resource set belong to different carriers.

According to a sixth aspect, this application provides a base station system, including a first base station and a second base station.

The first base station is configured to send first configuration information and second configuration information to a terminal device, where the first configuration information includes information about a first control resource set, and the second configuration information includes information about a second control resource set.

The first base station is further configured to send first control information to the terminal device in a first control channel candidate set corresponding to the first control resource set.

The second base station is configured to send second control information to the terminal device in a second control channel candidate set corresponding to the second control resource set, where a sum of a size of the first control channel candidate set and a size of the second control channel candidate set is not greater than a first threshold.

With reference to the sixth aspect, in a first possible implementation of the sixth aspect, the first configuration information further includes first transmission mode information associated with the first control information, and the second configuration information further includes second transmission mode information associated with the second control information; or the first base station is further configured to send third configuration information to the terminal device, where the third configuration information includes first transmission mode information associated with the first control information and second transmission mode information associated with the second control information.

With reference to the first possible implementation of the sixth aspect, in a second possible implementation of the sixth aspect, the first transmission mode information is a transmission mode; or the first transmission mode information is one or more of a resource mapping manner, a DMRS scrambling code sequence, and QCL.

With reference to the first possible implementation of the sixth aspect or the second possible implementation of the sixth aspect, in a third possible implementation of the sixth aspect, the second transmission mode information is a transmission mode; or the second transmission mode information is one or more of a resource mapping manner, a DMRS scrambling code sequence, and QCL.

With reference to the sixth aspect or the first possible implementation of the sixth aspect to the third possible implementation of the sixth aspect, in a fourth possible implementation of the sixth aspect, the first control resource set and the second control resource set belong to different carriers.

This application further provides a base station, and the base station may perform a method performed by the first base station in the sixth aspect.

This application further provides a base station, and the base station may perform a method performed by the second base station in the sixth aspect.

According to a seventh aspect, an embodiment of this application provides a computer storage medium, configured to store a computer software instruction used by the terminal device provided in the second aspect, the terminal device provided in the fourth aspect, or the base station system provided in the sixth aspect. The computer software instruction includes a program designed for performing the first aspect, the third aspect, or the fifth aspect.

According to an eighth aspect, this application further provides a computer program product including an instruction. When the computer program product runs on a computer, the computer is enabled to perform the method in the first aspect, the third aspect, or the fifth aspect.

DESCRIPTION OF EMBODIMENTS

To make the objectives, technical solutions, and advantages of this application clearer, the following further describes this application in detail with reference to the accompanying drawings.

Embodiments of this application are applicable to a 5G system (5th generation mobile communications system), for example, a communications system such as an access network using new radio (NR) or a cloud radio access network (CRAN), or may be applied to a future communications system above 5G.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 1:
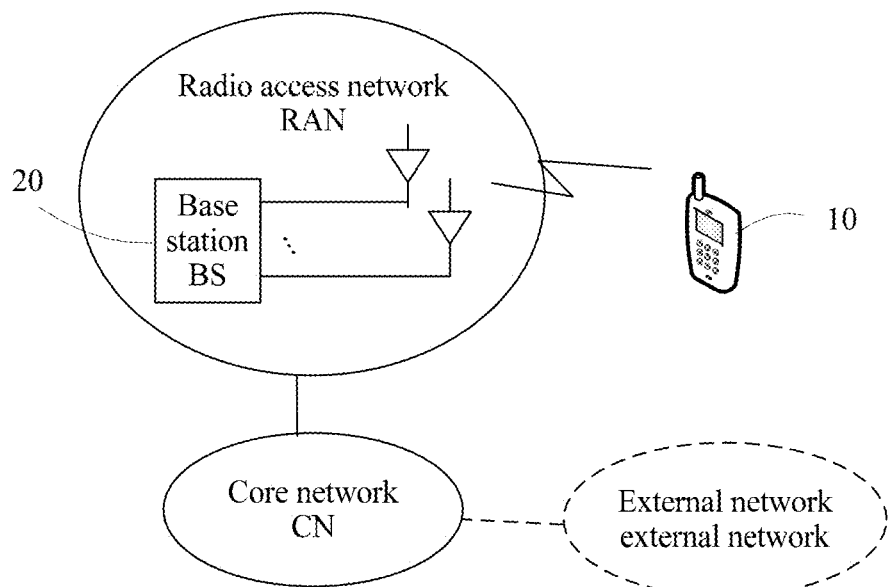
FIG. 1 is a schematic diagram of an application scenario according to this application.

FIG. 1 is a schematic diagram of a possible application scenario according to this application. As shown in FIG. 1, at least one user equipment UE 10 communicates with a radio access network (RAN). The RAN includes at least one base station (BS) 20. For clarity, only one base station and one UE are shown in the figure. The RAN is connected to a core network (CN). Optionally, the CN may be coupled to one or more external networks such as the Internet and a public switched telephone network (PSTN).

Figure 2:
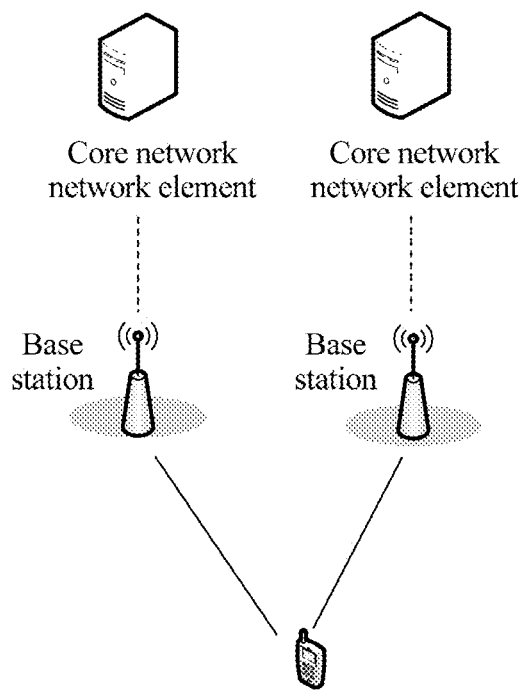
FIG. 2 is an architectural diagram of a system to which this application is applicable.

FIG. 2 is an architectural diagram of a system to which this application is applicable. The system includes the following network elements:

a core network network element, which is mainly responsible for signaling processing, that is, control plane functions, including functions such as access control, mobility management, attachment and detachment, a session management function, and gateway selection;

a base station, which is mainly responsible for functions such as radio resource management, quality of service (QoS) management, and data compression and encryption on an air interface side, where on a core network side, the base station is mainly responsible for forwarding control plane signaling to an MME and forwarding user plane service data to an S-GW, and is also referred to as a radio access network (RAN) device, which is a device connecting a terminal to a radio network, and includes but is not limited to an evolved NodeB (eNB), a radio network controller (RNC), a NodeB (NB), a base station controller (BSC), a base transceiver station (BTS), a home base station, a baseband unit (BBU), a gNodeB (gNB), a transmission and reception point (TRP), or a transmission point (TP), or may include a Wi-Fi access point (AP) or the like;

user equipment (UE) is also referred to as UE or referred to as a terminal device, and is a device that provides voice and/or data connectivity for a user, for example, a handheld device or an in-vehicle device that has a wireless connection function, where common terminals include, for example, a mobile phone, a tablet computer, a notebook computer, a palmtop computer, a mobile Internet device (MID), and a wearable device such as a smartwatch, a smart band, or a pedometer;

an interface between the base station and the core network network element, for example, an S1 interface;

an interface between base stations, for example, an X2 interface, configured to implement interworking between the base stations; and an interface between the terminal device and the base station, for example, a Uu interface.

The following first describes concepts of search space and incoherent joint transmission.

For the search space, the following describes the search space separately in a carrier aggregation (CA) scenario and a non-carrier aggregation scenario.

The non-carrier aggregation scenario, namely, a scenario in which UE has only one carrier, is first discussed.

The search space defines a search manner and a start location at which the UE blindly detects a downlink control channel. The UE monitors a downlink control channel candidate set in a non-discontinuous reception (non-DRX) subframe. This means that the UE needs to attempt to decode each downlink control channel in the set based on a format of DCI that needs to be listened to. The set is the search space of the UE. Search space $S_k^{(L)}$ at an aggregation level L (for example, {1, 2, 4, 8}) is defined as the downlink control channel candidate set.

The search space is divided into common search space and UE-specific search space. The common search space is used to transmit control information (cell-level common information) related to paging, a random access response (RAR), a broadcast control channel (BCCH), and the like. The information is the same for all UEs. The UE-specific search space is used to transmit control information (UE-level information) related to a downlink shared channel (DL-SCH), an uplink shared channel (UL-SCH), and the like.

An EPDCCH is also used as an example. It should be noted that the EPDCCH includes only UE-specific search space.

It can be learned from Table 1 (from Table 9.1.4-2b in the protocol 3GPP TS 36.213) that when a cell configures one EPDCCH set for the UE, for a DCI format, there are 15 (the EPDCCH set includes two PRBs) or 16 (the EPDCCH set includes four or eight PRBs) possible EPDCCH candidates. Because there are a maximum of two possible DCI formats during decoding in a transmission mode or state (for example, in which an RA-RNTI is used during random access), a total quantity of EPDCCH blind detection times of the UE does not exceed 32 (16×2). It can be learned from Table 2 (from Table 9.1.4-4a in the protocol 3GPP TS 36.213) that when a cell configures two EPDCCH sets for the UE, in this case, the two EPDCCH sets may have different transmission parameters (for example, centralized/distributed resource mapping, a DMRS scrambling sequence, and quasi co-location (QCL)). To ensure that the total quantity of EPDCCH blind detection times of the UE still does not exceed 32, EPDCCH candidate sets need to be divided into different EPDCCH sets. For example, when the two EPDCCH sets respectively include four PRB pairs and two PRB pairs, EPDCCH candidate sets in the EPDCCH sets are respectively {4, 4, 1, 1} and {2, 2, 1, 1}.

TABLE 1

EPDCCH candidates (one EPDCCH set of centralized mapping - Example 3) monitored by the UE

| | EPDCCH candidate quantity $M_p^{(L)}$ | | | |
|---|---|---|---|---|
| $N_{RB}^{Xp}$ | L = 1 | L = 2 | L = 4 | L = 8 |
| 2 | 8 | 4 | 2 | 1 |
| 4 | 6 | 6 | 2 | 2 |
| 8 | 6 | 6 | 2 | 2 |

TABLE 2

EPDCCH candidates (two EPDCCH sets of centralized mapping Example 3) monitored by the UE

| | | EPDCCH candidate quantity $[M_{p,1}^{(L)}, M_{p,2}^{(L)}]$ | | | |
|---|---|---|---|---|---|
| $N_{RB}^{Xp1}$ | $N_{RB}^{Xp2}$ | L = 1 | L = 2 | L = 4 | L = 8 |
| 2 | 2 | 3,3 | 3,3 | 1,1 | 1,1 |
| 4 | 4 | 3,3 | 3,3 | 1,1 | 1,1 |
| 8 | 8 | 3,3 | 3,3 | 1,1 | 1,1 |
| 4 | 2 | 4,2 | 4,2 | 1,1 | 1,1 |
| 8 | 2 | 4,2 | 4,2 | 1,1 | 1,1 |
| 8 | 4 | 3,3 | 3,3 | 1,1 | 1,1 |

The following describes the search space in the carrier aggregation scenario.

In the CA scenario, UE monitors search space of all activated carriers (including one primary carrier (PCarrier) and numOfActivatedDlSCarrier secondary carriers (SCarrier)) in each non-DRX subframe. Based on whether the UE is configured with cross-carrier scheduling, there may be the following several cases.

Case 1: The UE is not configured with cross-carrier scheduling on all carriers. In this case, the UE monitors a downlink control channel in search space on each activated carrier. A downlink control channel of each carrier is transmitted on the carrier, and all downlink control channels have no carrier indicator field (CIF) field.

Case 2: The UE is configured with cross-carrier scheduling on a carrier c. In this case, a downlink control channel on the carrier is definitely not sent on another carrier. The UE monitors a downlink control channel with a CIF in search space of the carrier.

Case 3: The UE is not configured with cross-carrier scheduling on a carrier c and is not configured to send a downlink control channel on another carrier. In this case, the UE monitors a downlink control channel without a CIF field in search space of the carrier.

Case 4: The UE is configured with cross-carrier scheduling and semi-persistent scheduling (SPS) on the PCarrier. In this case, the UE monitors a downlink control channel with a CIF in search space of the PCarrier. It should be noted that: (1) A downlink control channel on the PCarrier is never sent on another carrier (SCarrier). (2) SPS scheduling exists on only the PCarrier.

Case 5: For an SCarrier of the UE, it is configured that a downlink control channel, with a CIF, corresponding to the SCarrier is sent on another carrier. In this case, the UE does not monitor a downlink control channel on the SCarrier. On the another carrier used to send the downlink control channel for the SCarrier, the UE monitors at least a downlink control channel of the another carrier.

For the UE, the UE does not know a value of the CIF field carried in the downlink control channel, to be specific, does not know a specific carrier used to send the downlink control channel to the UE. The UE knows only a set of CIFs that may be carried in a downlink control channel sent on each specific carrier to the UE. Therefore, the UE tries all possible CIF values on the carrier to blindly detect the downlink control channel. Therefore, a maximum quantity of times of blind detection that needs to be performed by the UE configured with CA in UE-specific search space is directly proportional to a quantity of activated carriers, to be specific, is 32+32×numOfActivatedDlSCarrier.

The following describes incoherent joint transmission.

A coordinated multipoint transmission/reception (CoMP) technology implements coordinated transmission between transmission points at different geographical locations. In CoMP, the transmission points exchange information to avoid mutual interference, so as to improve quality of service and a throughput for a user. Current mainstream CoMP technology implementations may be classified into a joint processing (JP) technology and a coordinated scheduling/coordinated beamforming (CS/CB) technology.

A core idea of the JP technology is that all transmission points in a coordinated cell cluster share, on a same resource block, data used for transmission of UE. In other words, the data of the UE is available on a plurality of transmission points. Based on whether data transmitted by a user is from different transmission points at the same time, the JP technology may be classified into two types: a JT technology and dynamic point selection (DPS). In a JT transmission mode, a plurality of transmission points send data for same UE on a same time-frequency resource. In the JT mode, a previous inter-cell interference signal is converted into a desired signal to improve performance of a cell edge user. Based on different manners of combining information from a plurality of transmission points by a receive end, JT may be classified into two types: coherent transmission and incoherent transmission. In incoherent transmission JT, each transmission point uses an independent precoding scheme, and a signal is received at a receive end, to implement bit-level combination.

Currently, the CoMP technology is implemented based on an ideal backhaul link. Therefore, when a plurality of transmission points provide coordinated data transmission for same UE, the UE receives DCI from only a serving transmission point. The DCI includes scheduling information of the serving transmission point and another transmission point that provides coordinated transmission for the UE. The UE receives control information delivered by the serving transmission point, and receives, based on scheduling information that is of each transmission point participating in coordinated transmission and that is included in the control information, data transmitted by each transmission point. In coherent JT transmission, a network needs to obtain channel state information (CSI) of all coordinated transmission points, and adjust a phase of each transmission signal based on the channel information. In this way, all signals arriving at the receive end can be combined.

In 5G NR, the UE is supported in receiving a plurality of different data streams in a coordinated manner by using a plurality of transmission points connected based on a non-ideal backhaul link.

Different from the prior art, in this scenario, the UE not only needs to receive the DCI from the serving transmission point, but also needs to receive DCI from one or more coordinated transmission points.

In the prior art, when a cell configures two EPDCCH sets for the UE, DCI information included in both EPDCCH sets is the same. When the UE blindly detects one piece of DCI in the EPDCCH sets, if the UE successfully detects the DCI in a first EPDCCH set blindly, the UE no longer performs detection in a second EPDCCH set, or if the UE blindly detects no DCI in a first EPDCCH set, the UE further performs blind detection in a second EPDCCH set. When the UE blindly detects a plurality of pieces of DCI in the two EPDCCH sets, the UE needs to blindly detect DCI in all formats in a first EPDCCH set, and if all the DCI is successfully detected blindly, the UE no longer performs blind detection in a second EPDCCH set, or if there is DCI that is not blindly detected, the UE needs to continue to perform blind detection in a second EPDCCH set. In this case, to ensure that a quantity of blind detection times of the UE in one carrier does not increase, the plurality of pieces of DCI need to have a same payload size.

In incoherent joint transmission (JT) based on a non-ideal backhaul link, a terminal needs to separately receive, in a plurality of CORESETs, control information sent from a plurality of transmission points including a serving transmission point and a coordinated transmission point, so as to schedule data transmission on a same carrier. In this case, in the incoherent JT transmission, how to exchange control information between a base station and a terminal device is a problem to be resolved.

With reference to the accompanying drawings, the following describes in detail a data transmission method provided in this application. It should be noted that, incoherent transmission is used as an example for description in this application. However, solutions of this application are not limited to an incoherent scenario.

First, when a terminal device (which is referred to as UE below) has only one serving transmission point (which is referred to as a TRP 1 below) and has no coordinated transmission point, in this case, the serving transmission point TRP 1 sends configuration information through broadcast or higher layer signaling, to configure one CORESET for the UE. The configuration information further includes transmission parameter information of the CORESET. The transmission parameter information includes one or more of resource allocation information (distributed/centralized), a used demodulation reference signal (DMRS) scrambling sequence, quasi co-location (QCL), and other information. Alternatively, the resource allocation information includes a transmission mode. For example, the CORESET uses a centralized resource mapping manner, and occupies a 5 MHz bandwidth in frequency domain, and the transmission mode is TMS. The UE deduces the used transmission mode based on one or more of the resource allocation information, the DMRS scrambling sequence, and the QCL, or directly obtains the transmission mode from the configuration information. Then, the UE determines, based on a type of information expected to be received and the transmission mode, a format of DCI to be blindly detected, and blindly detects the DCI in the CORESET. For example, by using a radio network temporary identifier (RNTI) corresponding to the DCI format, the terminal device blindly detects the DCI on six control channel candidates corresponding to an aggregation level 1, six control channel candidates corresponding to an aggregation level 2, two control channel candidates corresponding to an aggregation level 4, and two control channel candidates corresponding to an aggregation level 8 in the CORESET.

A case in which UE has two transmission points is described in the embodiments of this application. One of the two transmission points is a serving transmission point (which is referred to as a TRP 1 or a first base station below), and the other transmission point is a coordinated transmission point (which is referred to as a TRP 2 or a second base station below). Specifically, there are two cases.

Figure 3:
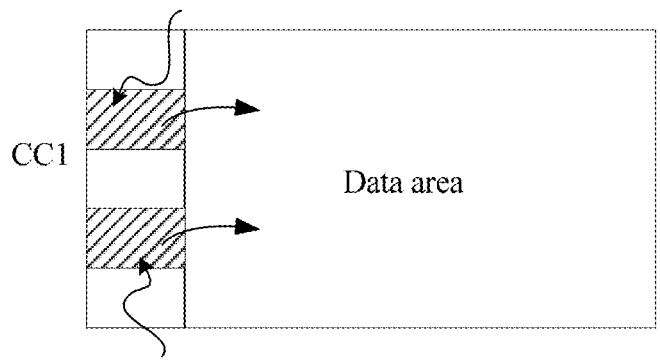
FIG. 3 is a schematic diagram of one type of resource allocation according to this application.

In a first case, as shown in FIG. 3, the serving transmission point sends first configuration information and second configuration information to the UE. The first configuration information includes information about a first control resource set (CORESET 1), and the second configuration information includes information about a second control resource set (CORESET 2). Specifically, the TRP 1 may configure the CORESET 1 and the CORESET 2 for the UE through broadcast or higher layer signaling. The TRP 1 and the TRP 2 communicate with the UE in a coordinated manner. In addition, the CORESET 1 and the CORESET 2 belong to a same carrier (CC1).

Figure 4:
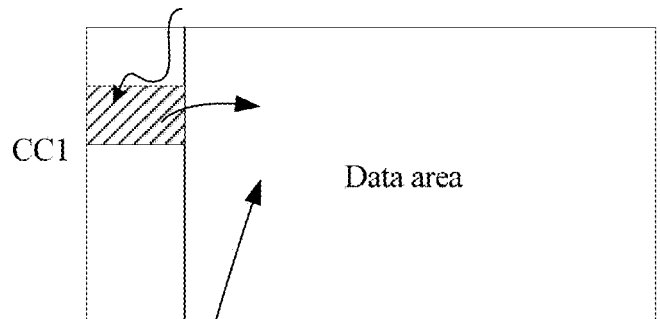
FIG. 4 is a schematic diagram of another type of resource allocation according to this application.
Figure 4:
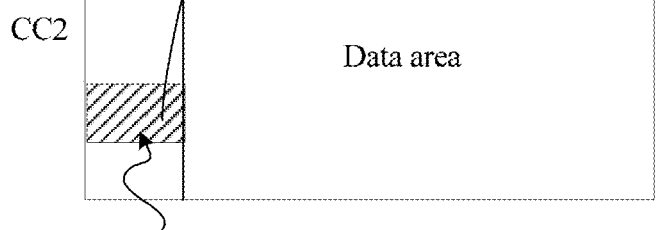

In a second case, as shown in FIG. 4, the TRP 1 sends first configuration information and second configuration information to the UE. The first configuration information includes information about a first control resource set (CORESET 1), and the second configuration information includes information about a second control resource set (CORESET 2). Specifically, the TRP 1 may configure the CORESET 1 and the CORESET 2 for the UE through broadcast or higher layer signaling. The TRP 1 and the TRP 2 communicate with the UE in a coordinated manner. In addition, the CORESET 1 belongs to a carrier 1 (CC1), and downlink data in the carrier 1 (CC1) is scheduled by using the local carrier. The CORESET 2 belongs to a carrier 2 (CC2), and downlink data in the carrier 1 (CC1) is scheduled in a cross-carrier manner.

It can be learned from FIG. 3 and FIG. 4 that a main difference between the two cases lies in whether the CORESET 1 and the CORESET 2 are from a same carrier. This application is applicable to both the case in which the CORESET 1 and the CORESET 2 belong to a same carrier and the case in which the CORESET 1 and the CORESET 2 belong to different carriers. In addition, when the CORESET 1 and the CORESET 2 belong to different carriers, the two different carriers may be from a same carrier or different carriers.

Optionally, in this application, a sum of a size of a first control channel candidate set corresponding to the CORESET 1 and a size of a second control channel candidate set corresponding to the CORESET 2 is not greater than a first threshold. The first threshold may be set according to the foregoing Table 9.1.4-2b. Specifically, a maximum quantity of control channel candidate sets corresponding to one control resource set in the foregoing Table 9.1.4-2b is used as the first threshold. To be specific, the first threshold may be set to 16 (8+4+2+1=15, 6+6+2+2=16, and therefore a maximum value is 16). Certainly, with development of communications standards, in future 5G communication, a corresponding parameter in the foregoing Table 9.1.4-2b may change. Therefore, a specific value of the first threshold in the embodiments of this application may be correspondingly adjusted with the development of the communications standards.

Referring to the foregoing Table 1 and Table 2, if the CORESET 1 includes four PRB pairs, and the CORESET 2 includes eight PRB pairs, quantities of control channel candidate sets corresponding to all aggregation levels may be divided according to Table 9.1.4-2b and Table 9.1.4-4a. For example, the six control channel candidate sets corresponding to the aggregation level L=1, the six control channel candidate sets corresponding to the aggregation level L=2, the two control channel candidate sets corresponding to the aggregation level L=4, and the two control channel candidate sets corresponding to the aggregation level L=8 are divided into (3, 3, 1, 1) and (3, 3, 1, 1), so that the size of the first control channel candidate set corresponding to the CORESET 1 is 3+3+1+1=8, and the size of the second control channel candidate set corresponding to the CORESET 2 is 3+3+1+1=8. Therefore, the sum of the size of the first control channel candidate set corresponding to the CORESET 1 and the size of the second control channel candidate set corresponding to the CORESET 2 is 16, and does not exceed the first threshold 16.

The following separately describes manners in which the UE performs blind detection in the two cases.

In the first case, the CORESET 1 and the CORESET 2 belong to a same carrier.

Figure 5:
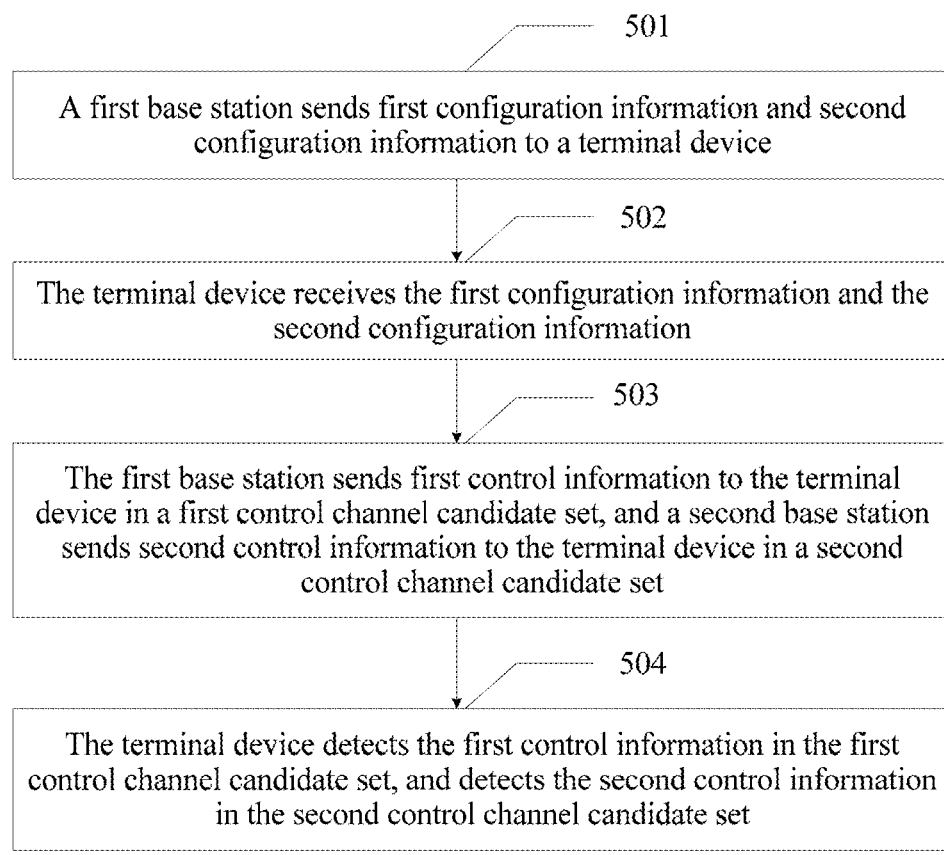
FIG. 5 is a schematic diagram of a data transmission method according to this application.

FIG. 5 shows a first data transmission method in the first case, and the method includes the following steps.

Step 501: A first base station sends first configuration information and second configuration information to a terminal device.

The first base station is a serving transmission point (TRP 1), the first configuration information includes information about a first control resource set (CORESET 1), and the second configuration information includes information about a second control resource set (CORESET 2).

Step 502: The terminal device receives the first configuration information and the second configuration information.

Step 503: The first base station sends first control information to the terminal device in a first control channel candidate set, and a second base station sends second control information to the terminal device in a second control channel candidate set.

Step 504: The terminal device detects the first control information in the first control channel candidate set, and detects the second control information in the second control channel candidate set.

In step 504, in this embodiment, the terminal learns in advance that the first control information is delivered by using the CORESET 1, and that the second control information is delivered by using the CORESET 2. Therefore, when performing DCI blind detection, the terminal device detects the first control information in only the first control channel candidate set, detects the second control information in only the second control channel candidate set, and does not need to detect both the first control information and the second control information in the first control channel candidate set, so that a quantity of blind detection times can be reduced.

Optionally, the terminal may learn, in the following manners, that the first control information is delivered by using the CORESET 1 and that the second control information is delivered by using the CORESET 2.

Manner 1: The terminal learns, by using the first configuration information and the second configuration information, that the first control information is delivered by using the CORESET 1 and that the second control information is delivered by using the CORESET 2.

Specifically, the first configuration information further includes first transmission mode information associated with the first control information, and the second configuration information further includes second transmission mode information associated with the second control information.

Therefore, when receiving the first transmission mode information, the terminal device may learn, by using the first transmission mode information, that the first control information is delivered by using the CORESET 1, and when receiving the second transmission mode information, may learn, by using the second transmission mode information, that the second control information is delivered by using the CORESET 2.

Optionally, the first transmission mode information is a transmission mode; or the first transmission mode information is one or more of a resource mapping manner, a DMRS scrambling code sequence, and QCL.

In other words, if the first transmission mode information obtained by the terminal device is one or more of the resource mapping manner, the DMRS scrambling code sequence, and the QCL, the terminal device may deduce a transmission mode, and then learn, based on the transmission mode, that the first control information is delivered in the first control channel candidate set. If the first transmission mode information obtained by the terminal device is directly the transmission mode, the terminal device learns, based on the transmission mode, that the first control information is delivered in the first control channel candidate set.

Optionally, the second transmission mode information is a transmission mode; or the second transmission mode information is one or more of a resource mapping manner, a DMRS scrambling code sequence, and QCL.

In other words, if the second transmission mode information obtained by the terminal device is one or more of the resource mapping manner, the DMRS scrambling code sequence, and the QCL, the terminal device may deduce a transmission mode, and then learn, based on the transmission mode, that the second control information is delivered in the second control channel candidate set. If the second transmission mode information obtained by the terminal device is directly the transmission mode, the terminal device learns, based on the transmission mode, that the second control information is delivered in the second control channel candidate set.

Resource mapping manners are divided into centralized mapping and distributed mapping.

Manner 2: The terminal learns, by using third configuration information, that the first control information is delivered by using the CORESET 1 and that the second control information is delivered by using the CORESET 2.

Specifically, the first base station further sends the third configuration information to the terminal device, and the third configuration information includes first transmission mode information associated with the first control information and second transmission mode information associated with the second control information.

In manner 2, the first base station sends the first transmission mode information and the second transmission mode information to the terminal device by separately delivering the third configuration information, the first transmission mode information indicates that the first base station delivers the first control information in the CORESET 1, and the second transmission mode information indicates that the second base station delivers the second control information in the CORESET 2.

The following uses a specific example for description. It is assumed that the terminal device determines, based on received configuration information, that DCI 1 needs to be blindly detected in the first control channel candidate set corresponding to the CORESET 1 delivered by the first base station, and DCI 2 needs to be blindly detected in the second control channel candidate set corresponding to the CORESET 2 delivered by the second base station. Specifically, the DCI 1 is blindly detected in four control channel candidate sets corresponding to an aggregation level 1, four control channel candidate sets corresponding to an aggregation level 2, zero control channel candidate sets corresponding to an aggregation level 4, and zero control channel candidate sets corresponding to an aggregation level 8 in the CORESET 1, and the DCI 2 is blindly detected in two control channel candidates corresponding to the aggregation level 1, three control channel candidates corresponding to the aggregation level 2, two control channel candidates corresponding to the aggregation level 4, and one control channel candidate corresponding to the aggregation level 8 in the CORESET 2. In other words, control channel candidate sets are divided into the CORESET 1 and the CORESET 2.

In this embodiment, a payload length of the first control information may be the same as or different from that of the second control information. In addition, when the payload length of the first control information is different from that of the second control information, a quantity of DCI blind detection times does not increase.

Figure 6:
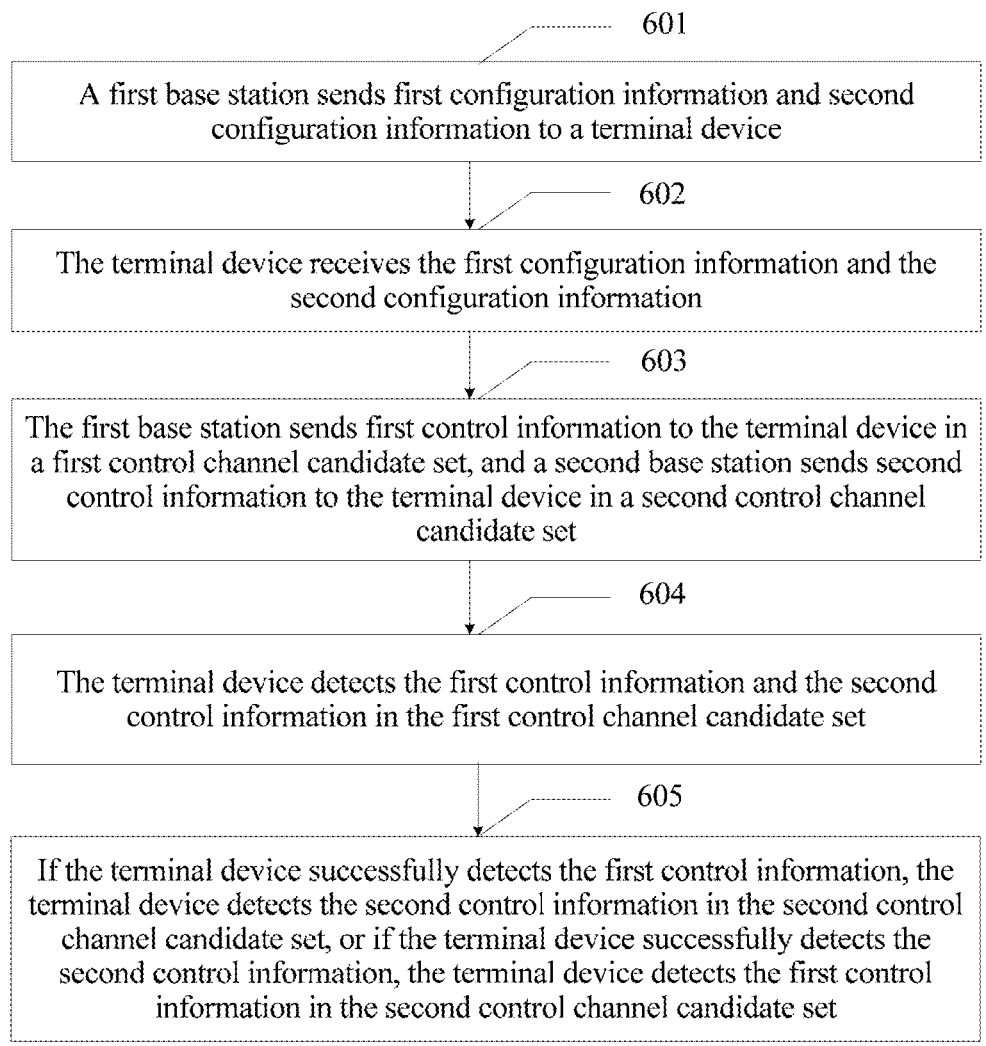
FIG. 6 is a schematic diagram of a data transmission method according to this application.

FIG. 6 shows a second data transmission method in the first case, and the method includes the following steps.

Step 601: A first base station sends first configuration information and second configuration information to a terminal device.

The first base station is a serving transmission point (TRP 1), the first configuration information includes information about a first control resource set (CORESET 1), and the second configuration information includes information about a second control resource set (CORESET 2).

Step 602: The terminal device receives the first configuration information and the second configuration information.

Step 603: The first base station sends first control information to the terminal device in a first control channel candidate set, and a second base station sends second control information to the terminal device in a second control channel candidate set.

Step 604: The terminal device detects the first control information and the second control information in the first control channel candidate set.

Step 605: If the terminal device successfully detects the first control information, the terminal device detects the second control information in the second control channel candidate set, or if the terminal device successfully detects the second control information, the terminal device detects the first control information in the second control channel candidate set.

The data transmission method shown in FIG. 6 is mainly applicable to a scenario in which the terminal device has a plurality of transmission points. Specifically, in the method, the terminal device does not know whether the first control information is sent in the CORESET 1 or the CORESET 2, and whether the second control information is sent in the CORESET 1 or the CORESET 2. However, the terminal device knows that there is only one piece of control information in each of the CORESET 1 and the CORESET 2. For example, the CORESET 1 includes the first control information, and the CORESET 2 includes the second control information, or the CORESET 1 includes the second control information, and the CORESET 2 includes the first control information.

Therefore, the terminal device first detects the first control information and the second control information in the first control channel candidate set. If the first control information is successfully detected, the terminal device detects the second control information in the second control channel candidate set. If the second control information is successfully detected, the terminal device detects the first control information in the second control channel candidate set.

Therefore, one piece of control information is detected in each control channel candidate set.

The following uses a specific example for description. If the terminal device determines that control information delivered by the first base station and the second base station is DCI 1 and DCI 2, the terminal device separately blindly detects the DCI 1 and the DCI 2 in the CORESET 1. If the terminal device successfully detects the DCI 1, the terminal device blindly detects the DCI 2 in the CORESET 2. If the terminal device successfully detects the DCI 2, the terminal device blindly detects the DCI 1 in the CORESET 2. In addition, it is assumed that control channel candidate sets are divided into different CORESETs. For example, in each of the CORESET 1 and the CORESET 2, three control channel candidates correspond to an aggregation level 1, three control channel candidates correspond to an aggregation level 2, one control channel candidate corresponds to an aggregation level 4, and one control channel candidate corresponds to an aggregation level 8, so that it is ensured that a sum of a size of the first control channel candidate set and a size of the second control channel candidate set does not exceed a first threshold.

Optionally, the DCI 1 and the DCI 2 have a same payload size.

In this embodiment of this application, according to a search space design method, in a scenario with incoherent JT transmission based on a non-ideal backhaul link, UE blindly detects a plurality of pieces of DCI from a plurality of transmission points. Control channel candidate sets are divided into different CORESETs, so that it is ensured that a quantity of blind detection times of the UE in one carrier does not increase with a quantity of configured CORESET sets.

In the second case, the CORESET 1 and the CORESET 2 belong to different carriers.

When the CORESET 1 and the CORESET 2 belong to different carriers, a data transmission method between a terminal device and a base station is the same as the data transmission method in the first case, and details are not described again. For details, refer to related descriptions in the first case.

This application further provides a candidate set division method. Details are as follows:

It is assumed that a CORESET 1 and a CORESET 2 are configured on a network side, the CORESET 1 corresponds to M1 PRBs in frequency domain, and the CORESET 2 corresponds to M2 PRBs in frequency domain. Aggregation levels used by UE to blindly detect DCI in both the CORESET 1 and the CORESET 2 are $\{L1, L2, \ldots, Ln\}$, and sizes of control channel candidate sets corresponding to the aggregation levels are respectively $\{k11, k21, \ldots, kn1\}$ and $\{k12, k22, \ldots, kn2\}$. It is assumed that a first threshold is K. Therefore, a sum of a size of a first control channel candidate set and a size of a second control channel candidate set is not greater than the first threshold K.

Candidate sets are divided based on the following several criteria:

(1) If the two CORESETs have a same size and use a same resource allocation (localized/distributed) manner, the candidates are equally divided in the two CORESETs.

For example, if both the CORESET 1 and the CORESET 2 use a localized (distributed) resource allocation manner, and M1=M2, ki1=ki2, where i=1, . . . , or n.

(2) In a same resource allocation manner, a larger CORESET has a larger quantity of candidates.

For example, if the CORESET 1 and the CORESET 2 use a same resource allocation manner, and M1>M2, ki1≥ki2, where i=1, . . . , or n.

(3) When sizes are the same, a CORESET that uses a localized resource allocation manner has a larger quantity of candidates.

For example, if the CORESET 1 and the CORESET 2 correspond to a same quantity of PRBs in frequency domain, in other words, M1=M2, the CORESET 1 uses a localized resource allocation manner, and the CORESET 2 uses a distributed resource allocation manner, ki1≥ki2, where i=1, . . . , or n.

(4) In some special cases, for example, the CORESET 1 uses a localized resource allocation manner, and the CORESET 2 uses a distributed resource allocation manner, and M1<M2. In this case, for a given aggregation level i, a factor is selected as a primary factor in a predefined manner, to determine values of ki1 and ki2.

For example, for a lower aggregation level, a resource allocation manner is used as a primary factor, in this case, ki1>ki2. For a higher aggregation level, a resource size is used as a primary factor, in this case, ki1<ki2.

Figure 7:
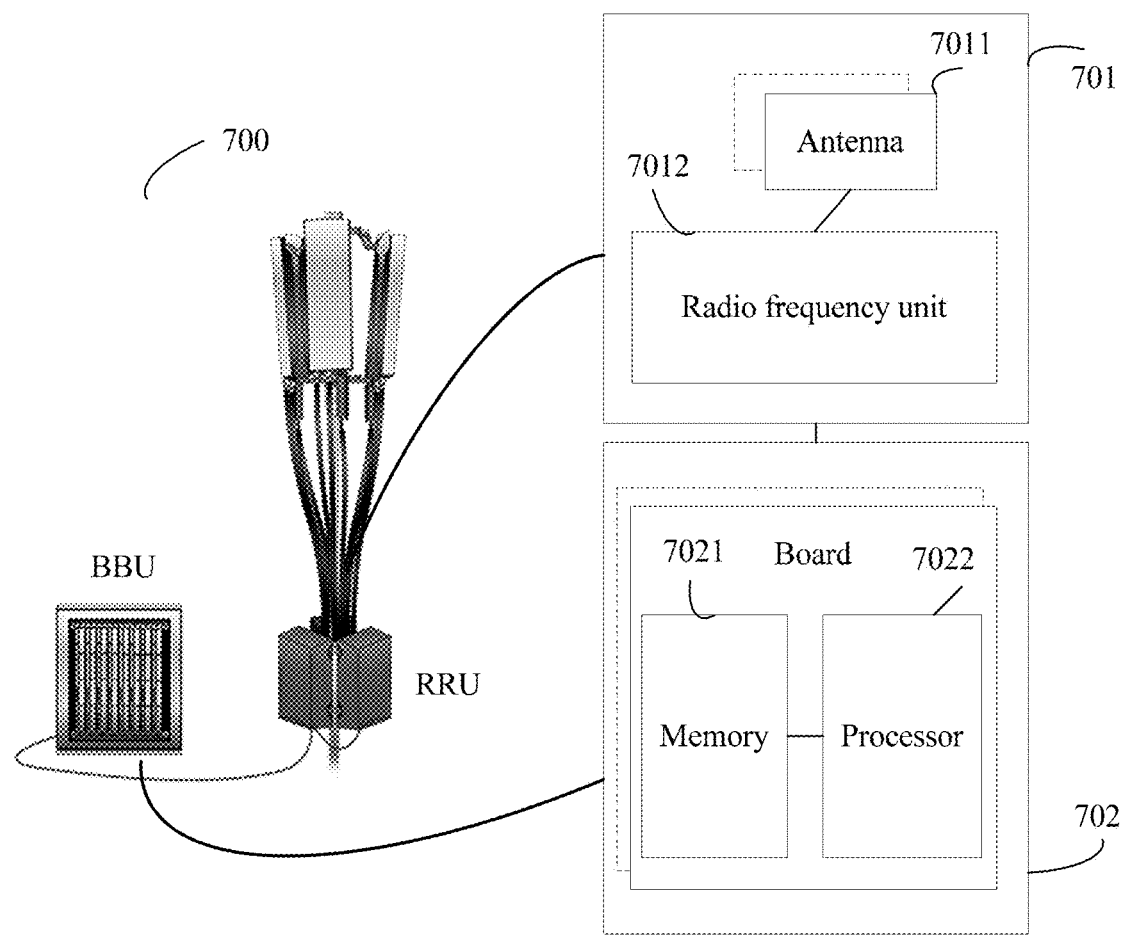
FIG. 7 is a schematic diagram of a base station according to this application.

Based on a same invention concept, an embodiment of this application further provides a base station 700. FIG. 7 is a schematic structural diagram of the base station 700. The base station 700 may be configured to perform some actions performed by the base station in FIG. 5 and FIG. 6. The base station 700 includes one or more remote radio units (RRU) 701 and one or more baseband units (BBU) 702. The RRU 701 may be referred to as a transceiver unit, a transceiver machine, a transceiver circuit, a transceiver, or the like, and the RRU 701 may include at least one antenna 7011 and a radio frequency unit 7012. The RRU 701 part is mainly configured to: send/receive a radio frequency signal, and perform conversion between a radio frequency signal and a baseband signal. For example, the RRU 701 is configured to send a signaling indication described in the foregoing embodiments to user equipment (namely, a terminal). The BBU 702 part is mainly configured to: perform baseband processing, control the base station, and the like. The RRU 701 and the BBU 702 may be physically disposed together, or may be physically separated, namely, a distributed base station.

The BBU 702 is a control center of the base station, may also be referred to as a processing unit, and is mainly configured to complete a baseband processing function such as channel coding, multiplexing, modulation, or spectrum spreading. For example, the BBU (processing unit) may be configured to control the base station to perform some actions performed by the base station in FIG. 5 and FIG. 6.

In an example, the BBU 702 may include one or more boards, and a plurality of boards may jointly support a radio access network of a single access standard (such as an LTE network), or may separately support radio access networks of different access standards. The BBU 702 further includes a memory 7021 and a processor 7022. The memory 7021 is configured to store a necessary instruction and necessary data. For example, the memory 7021 stores the configuration information in the foregoing embodiments. The processor 7022 is configured to control the base station to perform a necessary action, for example, is configured to control the base station to perform some actions performed by the base station in FIG. 5 and FIG. 6. The memory 7021 and the processor 7022 may serve one or more boards. In other words, a memory and a processor may be separately disposed on each board. Alternatively, a plurality of boards share a same memory and processor. In addition, a necessary circuit is further disposed on each board.

Figure 8:
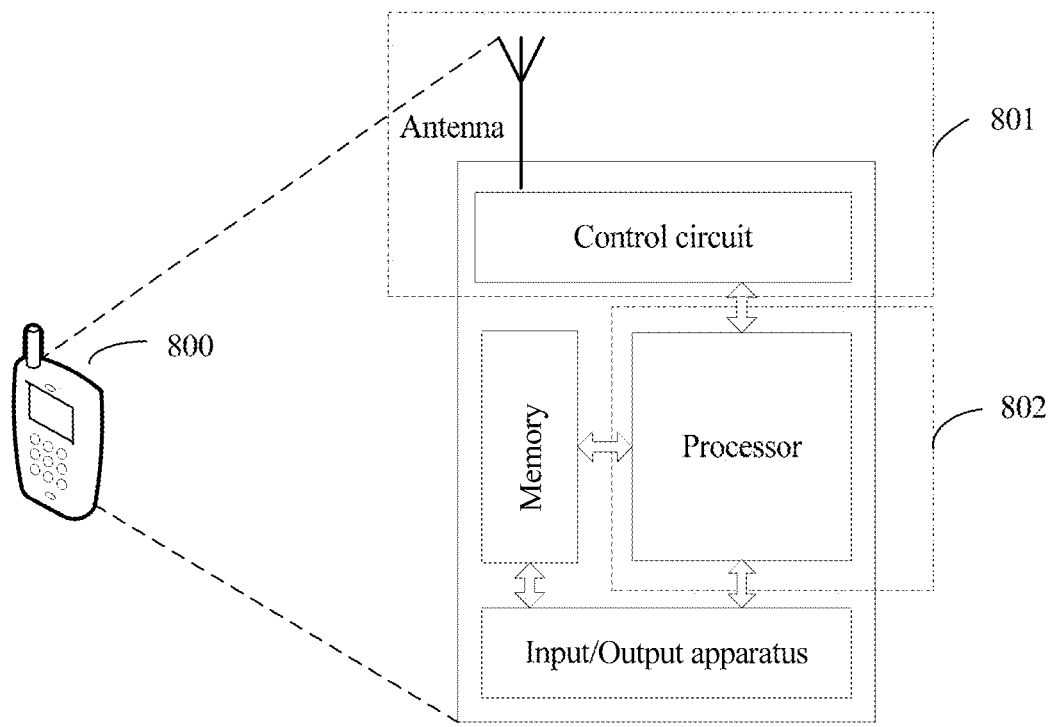
FIG. 8 is a schematic diagram of a terminal device according to this application.

Based on a same invention concept, an embodiment of this application further provides a terminal device 800. FIG. 8 is a schematic structural diagram of user equipment UE. For ease of description, FIG. 8 shows only main components of the user equipment. As shown in FIG. 8, the terminal device 800 includes a processor, a memory, a control circuit, an antenna, and an input/output apparatus. The processor is mainly configured to: process a communications protocol and communication data, control the entire terminal device, execute a software program, and process data of the software program, for example, configured to support the terminal device in performing actions described in FIG. 5 and FIG. 6. The memory is mainly configured to store a software program and data, for example, store the configuration information described in the foregoing embodiments. The control circuit is mainly configured to: convert a baseband signal and a radio frequency signal, and process a radio frequency signal. The control circuit and the antenna may also be referred to as a transceiver, and is mainly configured to: receive/send a radio frequency signal in an electromagnetic wave form, and receive a signaling indication and/or a reference signal sent by a base station. For details, refer to descriptions in the foregoing related parts. The input/output apparatus, such as a touchscreen, a display, or a keyboard, is mainly configured to: receive data entered by a user, and output data to the user.

After the terminal device is powered on, the processor may read a software program in a storage unit, interpret and execute an instruction of the software program, and process data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that for ease of description, FIG. 8 shows only one memory and only one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data, and the central processing unit is mainly configured to: control the entire terminal device, execute a software program, and process data of the software program. The processor in FIG. 8 integrates functions of the baseband processor and the central processing unit. A person skilled in the art may understand that the baseband processor and the central processing unit may be alternatively processors independent of each other, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built into the processor, or may be stored in a storage unit in a form of a software program, and the processor executes the software program to implement a baseband processing function.

For example, in this embodiment of this application, the antenna having receiving and sending functions and the control circuit may be considered as a transceiver unit 801 of the terminal device 800, and the processor having a processing function may be considered as a processing unit 802 of the terminal device 800. As shown in FIG. 8, the terminal device 800 includes the transceiver unit 801 and the processing unit 802. The transceiver unit may also be referred to as a transceiver, a transceiver machine, a transceiver apparatus, or the like. Optionally, a component that is in the transceiver unit 801 and that is configured to implement a receiving function is considered as a receiving unit, and a component that is in the transceiver unit 801 and that is configured to implement a sending function is considered as a sending unit. In other words, the transceiver unit 801 includes the receiving unit and the sending unit. For example, the receiving unit may also be referred to as a receiver machine, a receiver, a receiver circuit, or the like, and the sending unit may also be referred to as a transmitter machine, a transmitter, a transmitter circuit, or the like.

The transceiver unit 801 is configured to receive first configuration information and second configuration information from a base station, where the first configuration information includes information about a first control resource set, and the second configuration information includes information about a second control resource set.

The processing unit 802 is configured to: detect first control information in a first control channel candidate set corresponding to the first control resource set, and detect second control information in a second control channel candidate set corresponding to the second control resource set, where a sum of a size of the first control channel candidate set and a size of the second control channel candidate set is not greater than a first threshold.

Optionally, a payload length of the first control information is different from that of the second control information.

Optionally, the first configuration information further includes first transmission mode information associated with the first control information, and the second configuration information further includes second transmission mode information associated with the second control information; or the transceiver unit 801 is further configured to receive third configuration information from the base station, where the third configuration information includes first transmission mode information associated with the first control information and second transmission mode information associated with the second control information.

Optionally, the first transmission mode information is a transmission mode; or
the first transmission mode information is one or more of a resource mapping manner, a demodulation reference signal DMRS scrambling code sequence, and quasi co-location QCL.

Optionally, the second transmission mode information is a transmission mode; or the second transmission mode information is one or more of a resource mapping manner, a DMRS scrambling code sequence, and QCL.

Optionally, the first control resource set and the second control resource set belong to different carriers.

Alternatively, the transceiver unit 801 is configured to receive first configuration information and second configuration information from a base station, where the first configuration information includes information about a first control resource set, and the second configuration information includes information about a second control resource set.

The processing unit 802 is configured to: detect first control information and second control information in a first control channel candidate set corresponding to the first control resource set; and if the first control information is successfully detected, detect the second control information in a second control channel candidate set corresponding to the second control resource set; or if the second control information is successfully detected, detect the first control information in a second control channel candidate set, where a sum of a size of the first control channel candidate set and a size of the second control channel candidate set is not greater than a first threshold.

Optionally, a payload length of the first control information is the same as that of the second control information.

Optionally, the first control resource set and the second control resource set belong to different carriers.

Figure 9:
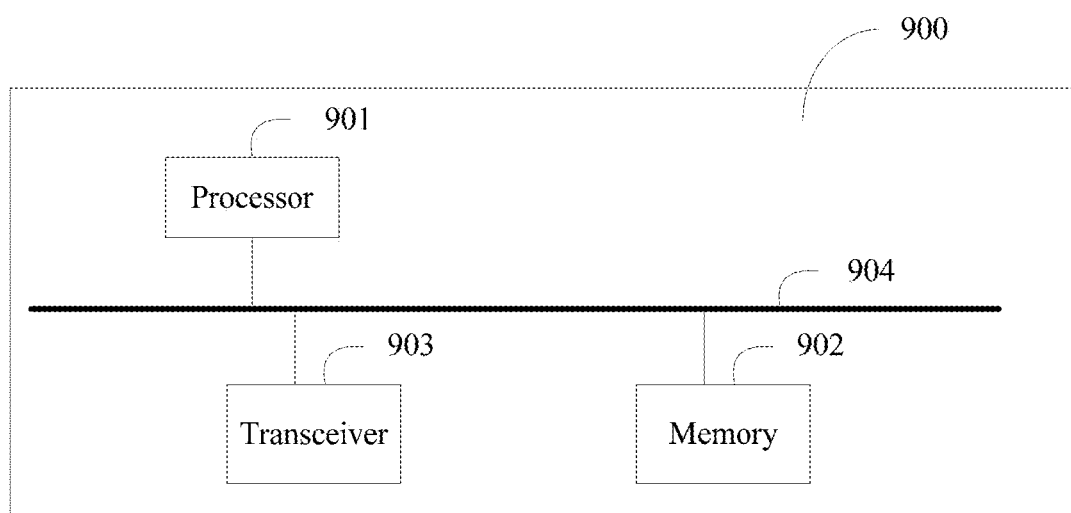
FIG. 9 is a schematic diagram of an apparatus according to this application.

Based on a same invention concept, an embodiment of this application further provides an apparatus. The apparatus may be a base station, or may be a terminal device. As shown in FIG. 9, the apparatus includes at least a processor 901 and a memory 902, may further include a transceiver 903, and may further include a bus 904.

The processor 901, the memory 902, and the transceiver 903 are all connected by using the bus 904.

The memory 902 is configured to store a computer executable instruction.

The processor 901 is configured to execute the computer executable instruction stored in the memory 902.

When the apparatus 900 is a base station, the processor 901 executes the computer executable instruction stored in the memory 902, so that the apparatus 900 performs steps performed by the base station in the data transmission methods provided in FIG. 5 and FIG. 6, or the base station is deployed with functional units corresponding to the steps.

When the apparatus 900 is a terminal device, the processor 901 executes the computer executable instruction stored in the memory 902, so that the apparatus 900 performs steps performed by the terminal device in the data transmission methods provided in FIG. 5 and FIG. 6, or the terminal device is deployed with functional units corresponding to the steps.

The processor 901 may include different types of processors 901 or a same type of processor 901. The processor 901 may be any one of the following components with a computing processing capability: a central processing unit (CPU), an ARM processor, a field programmable gate array (FPGA), a dedicated processor, and the like. In an optional implementation, the processor 901 may alternatively be integrated as a many-core processor.

The memory 902 may be any one or any combination of the following storage media: a random access memory (RAM), a read-only memory (ROM), a non-transitory memory (NVM), a solid-state drive (SSD), a mechanical hard disk, a magnetic disk, a disk array, and the like.

The transceiver 903 is used for data exchange between the apparatus 900 and another device. For example, if the apparatus 900 is a base station, the base station may perform a part performed by the base station in the methods shown in FIG. 5 and FIG. 6. The base station exchanges data with a terminal by using the transceiver 903. If the apparatus 900 is a terminal, the terminal may perform a part performed by the terminal device in the methods shown in FIG. 5 and FIG. 6. The terminal device exchanges data with a base station by using the transceiver 903. The transceiver 903 may be any one or any combination of the following components with a network access function: a network interface (for example, an Ethernet interface), a wireless network interface card, and the like.

The bus 904 may include an address bus, a data bus, a control bus, and the like. For ease of denotation, the bus is represented by using a thick line in FIG. 9. The bus 904 may be any one or any combination of the following components used for wired data transmission: an industry standard architecture (ISA) bus, a peripheral component interconnect (PCI) bus, an extended industry standard architecture (EISA) bus, and the like.

An embodiment of this application provides a computer readable storage medium, and the computer readable storage medium stores a computer executable instruction. A processor of a base station or a terminal device executes the computer executable instruction, so that the base station or the terminal device performs steps performed by the base station or the terminal in the methods shown in FIG. 5 and FIG. 6, or the base station or the terminal is deployed with functional units corresponding to the steps.

An embodiment of this application provides a computer program product. The computer program product includes a computer executable instruction, and the computer executable instruction is stored in a computer readable storage medium. A processor of a base station or a terminal may read the computer executable instruction from the computer readable storage medium. The processor executes the computer executable instruction, so that the base station or the terminal performs steps performed by the base station or the terminal in the methods shown in FIG. 5 and FIG. 6, or the base station or the terminal is deployed with functional units corresponding to the steps.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of the embodiments of this application.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may be alternatively integrated into a processor. The processor and the storage medium may be arranged in an ASIC, and the ASIC may be arranged in a terminal device. Optionally, the processor and the storage medium may be alternatively arranged in different components of a terminal device.

In one or more example designs, the functions described in the embodiments of this application may be implemented by using hardware, software, firmware, or any combination thereof. If the functions are implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general-purpose or special computer. For example, such a computer-readable medium may include but is not limited to a RAM, a ROM, an EEPROM, a CD-ROM or another optical disc storage, a disk storage or another magnetic storage apparatus, or any other medium that may be used to bear or store program code, where the program code is in a form of an instruction or a data structure or in a form that can be read by a general-purpose or special computer or a general-purpose or special processor. In addition, any connection may be appropriately defined as a computer-readable medium. For example, if software is transmitted from a website, a server, or another remote resource by using a coaxial cable, an optical fiber computer, a twisted pair, or a digital subscriber line (DSL) or in a wireless manner, such as infrared, radio, or microwave, the software is included in a defined computer-readable medium. The disk and the disc include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

Figure 10:
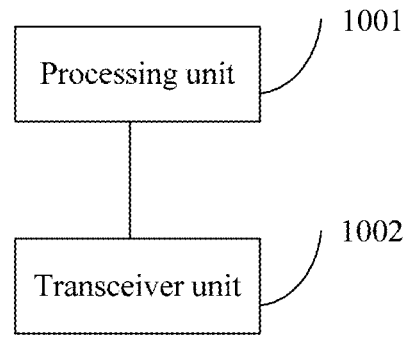
FIG. 10 is a schematic diagram of a terminal device according to this application.

Based on a same invention concept, this application further provides a terminal device. As shown in FIG. 10, the terminal device includes a processing unit 1001 and a transceiver unit 1002. The terminal device may be configured to perform a part performed by the terminal device in the method shown in FIG. 5.

The transceiver unit 1002 is configured to receive first configuration information and second configuration information from a base station, where the first configuration information includes information about a first control resource set, and the second configuration information includes information about a second control resource set.

The processing unit 1001 is configured to: detect first control information in a first control channel candidate set corresponding to the first control resource set, and detect second control information in a second control channel candidate set corresponding to the second control resource set, where a sum of a size of the first control channel candidate set and a size of the second control channel candidate set is not greater than a first threshold.

Optionally, a payload length of the first control information is different from that of the second control information.

Optionally, the first configuration information further includes first transmission mode information associated with the first control information, and the second configuration information further includes second transmission mode information associated with the second control information; or the transceiver unit 1002 is further configured to receive third configuration information from the base station, where the third configuration information includes first transmission mode information associated with the first control information and second transmission mode information associated with the second control information.

Optionally, the first transmission mode information is a transmission mode; or the first transmission mode information is one or more of a resource mapping manner, a demodulation reference signal DMRS scrambling code sequence, and quasi co-location QCL.

Optionally, the second transmission mode information is a transmission mode; or the second transmission mode information is one or more of a resource mapping manner, a DMRS scrambling code sequence, and QCL.

Optionally, the first control resource set and the second control resource set belong to different carriers.

Figure 11:
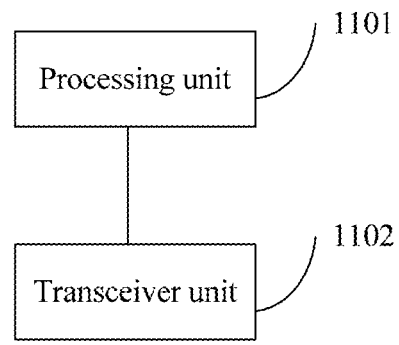
FIG. 11 is a schematic diagram of a terminal device according to this application.

Based on a same invention concept, this application further provides a terminal device. As shown in FIG. 11, the terminal device includes a processing unit 1101 and a transceiver unit 1102. The terminal device may be configured to perform a part performed by the terminal device in the method shown in FIG. 6.

The transceiver unit 1102 is configured to receive first configuration information and second configuration information from a base station, where the first configuration information includes information about a first control resource set, and the second configuration information includes information about a second control resource set.

The processing unit 1101 is configured to: detect first control information and second control information in a first control channel candidate set corresponding to the first control resource set; and if the first control information is successfully detected, detect the second control information in a second control channel candidate set corresponding to the second control resource set; or if the second control information is successfully detected, detect the first control information in a second control channel candidate set, where a sum of a size of the first control channel candidate set and a size of the second control channel candidate set is not greater than a first threshold.

Optionally, a payload length of the first control information is the same as that of the second control information.

Optionally, the first control resource set and the second control resource set belong to different carriers.

Figure 12:
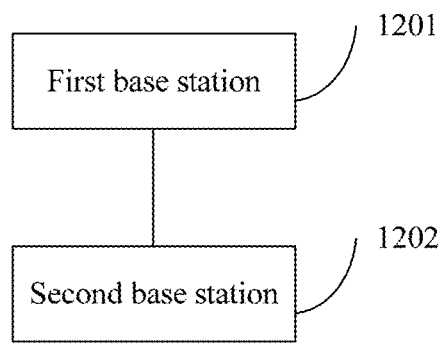
FIG. 12 is a schematic diagram of a base station system according to this application.

Based on a same invention concept, this application further provides a base station system. As shown in FIG. 12, the base station system includes a first base station 1201 and a second base station 1202. The first base station 1201 may be configured to perform a part performed by the first base station in the methods shown in FIG. 5 and FIG. 6, and the second base station 1202 may be configured to perform a part performed by the second base station in the methods shown in FIG. 5 and FIG. 6.

The first base station 1201 is configured to send first configuration information and second configuration information to a terminal device, where the first configuration information includes information about a first control resource set, and the second configuration information includes information about a second control resource set.

The first base station 1201 is further configured to send first control information to the terminal device in a first control channel candidate set corresponding to the first control resource set.

The second base station 1202 is configured to send second control information to the terminal device in a second control channel candidate set corresponding to the second control resource set, where a sum of a size of the first control channel candidate set and a size of the second control channel candidate set is not greater than a first threshold.

Optionally, the first configuration information further includes first transmission mode information associated with the first control information, and the second configuration information further includes second transmission mode information associated with the second control information; or the first base station 1201 is further configured to send third configuration information to the terminal device, where the third configuration information includes first transmission mode information associated with the first control information and second transmission mode information associated with the second control information.

Optionally, the first transmission mode information is a transmission mode; or the first transmission mode information is one or more of a resource mapping manner, a DMRS scrambling code sequence, and QCL.

Optionally, the second transmission mode information is a transmission mode; or the second transmission mode information is one or more of a resource mapping manner, a DMRS scrambling code sequence, and QCL.

Optionally, the first control resource set and the second control resource set belong to different carriers.

Figure 13A:
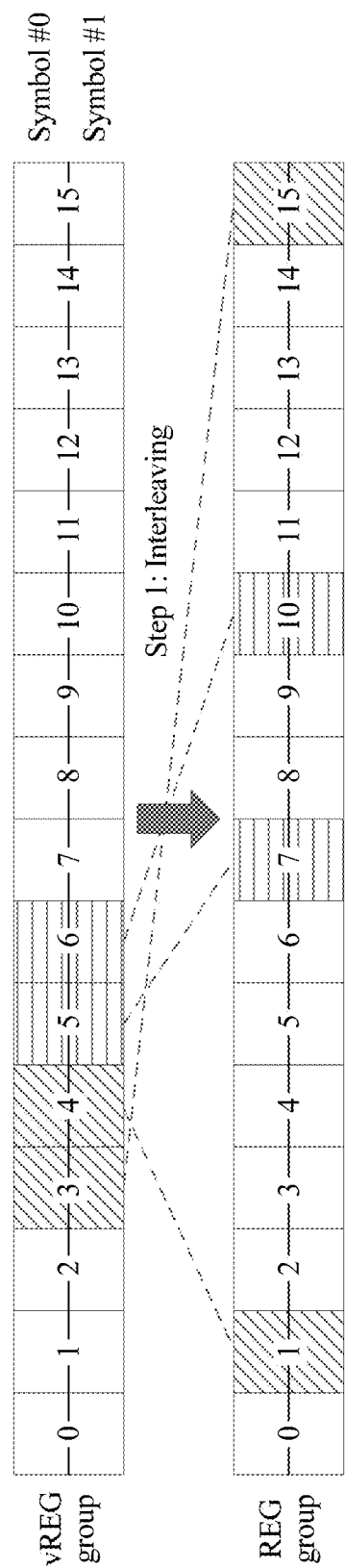
FIG. 13(a) shows a distributed mapping manner from a CCE to a REG according to this application.
Figure 13B:
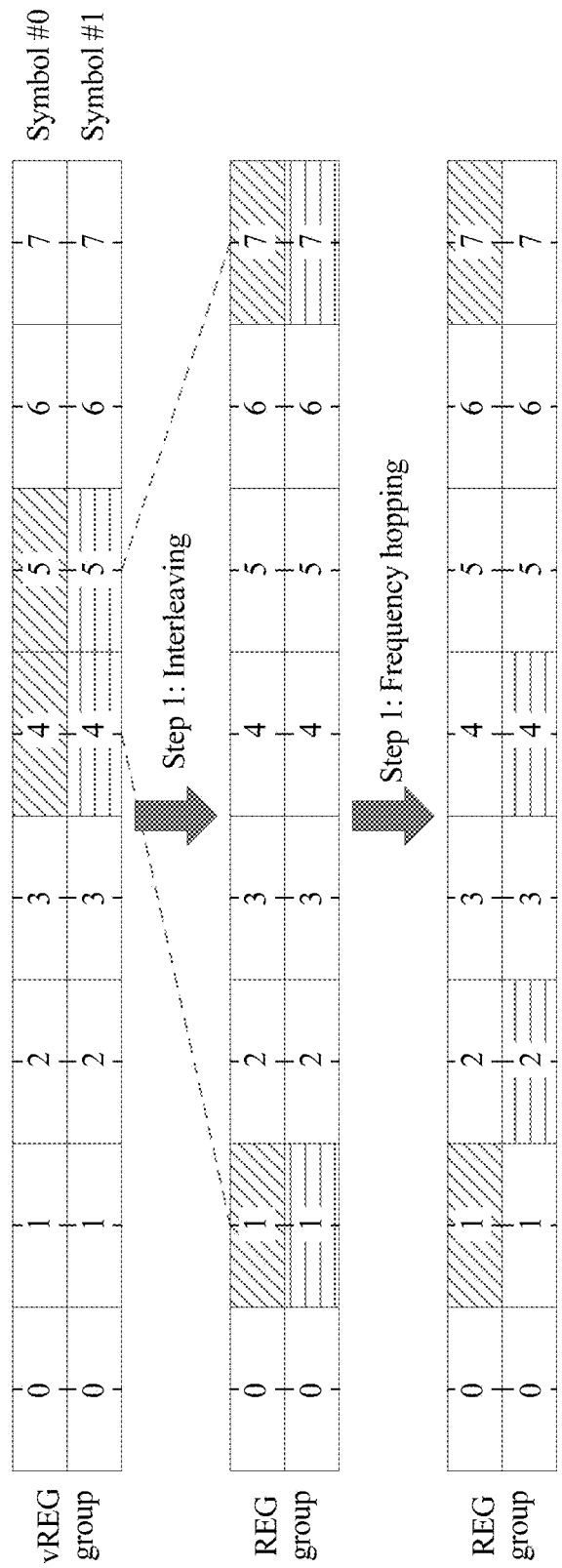
FIG. 13(b) shows a distributed mapping manner from a CCE to a REG according to this application.

This application further provides a distributed mapping manner from a control channel element (CCE) to a resource element group (REG). As shown in FIG. 13(a) and FIG. 13(b), UE calculates a CCE index corresponding to search space at an aggregation level L, and determines a virtual REG index corresponding to each CCE.

One block represents one REG, occupies one PRB in frequency domain, and occupies one OFDM symbol in time domain, and blocks of a same color form one CCE. In the figure, one CCE includes four REGs. However, this method may be simply extended to a case in which one CCE includes six, eight, or more REGs.

A process of distributed mapping from a CCE to a REG is mainly divided into two steps.

Step 1 is interleaving: Consecutive virtual REG groups in each symbol group are mapped to inconsecutive REG groups. Each symbol group includes one or more symbols. This depends on a fact that one CCE occupies one or more symbols in time domain. Each (virtual) REG group includes P REGs, and there may be one REG group including less than P REGs. A virtual REG group i includes a total of PX virtual REGs numbered PXi to PXi+PX−1, where X is a quantity of symbols included in one symbol group (X=2 in FIG. 13(a) and X=1 in FIG. 13(b)). The REG group occupies P PRBs (P=1 in FIG. 13(a) and P=2 in FIG. 13(b)) in frequency domain, and occupies one symbol group in time domain.

The interleaving is refined into the following several substeps:

(1) Determine a value of $N_{gap}$, a value of P, and a quantity of virtual REGs. The value of $N_{gap}$ may be determined based on a bandwidth of a control resource set, or may be configured based on a network side. The value of P may be determined based on the bandwidth and/or an aggregation level of the control resource set, or may be configured based on the network side. Virtual REG groups in each symbol group are numbered 0 to $N_{vREG}^{DL}-1$. A formula for calculating $N_{vREG}^{DL}$ is as follows:

$$N_{vREG}^{DL}=2\cdot\min(N_{gp}, N_{REG}^{DL}-N_{gap})$$

$N_{vREG}^{DL}$ is a quantity of REG groups in one symbol group in the control resource set.

(2) Determine an interleaving matrix ("horizontal placement") of virtual REG groups. The interleaving matrix has $N_{row}=\lceil N_{vREG}^{DL}/4P\rceil\cdot P$ rows and four columns in total. The virtual REG groups are written into the matrix row-by-row, and are read column-by-column ("horizontal placement and column-based fetching"). A quantity $4N_{row}$ of elements included in the matrix may be greater than $N_{vREG}^{DL}$. In this case, redundant elements are filled in with "null", and the elements filled in with "null" are located in the second column and the fourth column of last $N_{null}/2$ rows. A quantity of elements filled in with "null" is $N_{null}=4N_{row}-N_{vREG}^{DL}$. For example, $N_{REG}^{DL}=50$, $N_{gap}=9$, and P=3. It can be learned through calculation that $N_{vREG}^{DL}=18$, $N_{row}=6$, and $N_{null}=6$. In this case, the generated interleaving matrix is:

$$\begin{bmatrix} 0 & 1 & 2 & 3 \\ 4 & 5 & 6 & 7 \\ 8 & 9 & 10 & 11 \\ 12 & * & 13 & * \\ 14 & * & 15 & * \\ 16 & * & 17 & * \end{bmatrix}$$

(3) Determine a REG corresponding to a virtual REG ("column-based fetching"). "Column-based fetching" is a process of mapping a virtual REG group to a REG group. In this process, a "null" element is ignored. For example, a REG group corresponding to a virtual REG group 3 needs to be determined. The foregoing matrix is read column-by-column, and * is skipped, until the fifteenth element is read. In other words, a read sequence is (0, 4, 8, 12, 14, 16, 1, 5, 9, 2, 6, 10, 13, 15, 17, 3), and 3 is obtained at the fifteenth element. Therefore, the virtual REG group 3 corresponds to the REG group 15.

Step 2 is frequency hopping between symbol groups.

Based on step 1, in a symbol group i, an offset $K_i$ exists between REGs corresponding to a same virtual REG index in frequency domain, as shown in FIG. 13(b).

According to the foregoing description of this specification in this application, a person skilled in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

What is claimed is:

1. A data transmission method, wherein the method comprises:
   receiving, by a terminal device, first configuration information and second configuration information from a base station, wherein the first configuration information comprises information about a first control resource set, and wherein the second configuration information comprises information about a second control resource set;
   detecting, by the terminal device, first control information in a first control channel candidate set corresponding to the first control resource set; and
   in response to successfully detecting the first control information in the first control channel candidate set corresponding to the first control resource set, detecting, by the terminal device, second control information in a second control channel candidate set corresponding to the second control resource set, wherein a sum of a size of the first control channel candidate set and a size of the second control channel candidate set is not greater than a first threshold.

2. The method according to claim 1, wherein a payload length of the first control information is different from a payload length of the second control information.

3. The method according to claim 1, wherein:
   the first configuration information further comprises first transmission mode information associated with the first control information, and the second configuration information further comprises second transmission mode information associated with the second control information; or
   before the detecting, by the terminal device, first control information in a first control channel candidate set corresponding to the first control resource set, the method further comprises:
      receiving, by the terminal device, third configuration information from the base station, wherein the third configuration information comprises first transmission mode information associated with the first control information and second transmission mode information associated with the second control information.

4. The method according to claim 3, wherein:
   the first transmission mode information is a transmission mode; or
   the first transmission mode information is one or more of a resource mapping manner, a demodulation reference signal (DMRS) scrambling code sequence, and quasi co-location (QCL).

5. The method according to claim 3, wherein:
   the second transmission mode information is a transmission mode; or
   the second transmission mode information is one or more of a resource mapping manner, a DMRS scrambling code sequence, and QCL.

6. The method according to claim 1, wherein the first control resource set and the second control resource set belong to different carriers.

7. A terminal device, comprising:
   a transceiver, the transceiver configured to receive first configuration information and second configuration information from a base station, wherein the first configuration information comprises information about a first control resource set, and wherein the second configuration information comprises information about a second control resource set; and at least one processor, the at least one processor configured to:
  detect first control information in a first control channel candidate set corresponding to the first control resource set; and
  in response to successfully detecting the first control information in the first control channel candidate set corresponding to the first control resource set, detect second control information in a second control channel candidate set corresponding to the second control resource set, wherein a sum of a size of the first control channel candidate set and a size of the second control channel candidate set is not greater than a first threshold.

8. The terminal device according to claim 7, wherein a payload length of the first control information is different from a payload length of the second control information.

9. The terminal device according to claim 7, wherein:
  the first configuration information further comprises first transmission mode information associated with the first control information, and the second configuration information further comprises second transmission mode information associated with the second control information; or
  the transceiver is further configured to receive third configuration information from the base station, wherein the third configuration information comprises first transmission mode information associated with the first control information and second transmission mode information associated with the second control information.

10. The terminal device according to claim 9, wherein:
  the first transmission mode information is a transmission mode; or
  the first transmission mode information is one or more of a resource mapping manner, a demodulation reference signal (DMRS) scrambling code sequence, and quasi co-location (QCL).

11. The terminal device according to claim 9, wherein:
  the second transmission mode information is a transmission mode; or
  the second transmission mode information is one or more of a resource mapping manner, a DMRS scrambling code sequence, and QCL.

12. The terminal device according to claim 7, wherein the first control resource set and the second control resource set belong to different carriers.

13. A base station system, comprising a first base station and a second base station, wherein:
  the first base station is configured to:
    send first configuration information and second configuration information to a terminal device, wherein the first configuration information comprises information about a first control resource set, and wherein the second configuration information comprises information about a second control resource set; and
    send first control information to the terminal device in a first control channel candidate set corresponding to the first control resource set; and
  the second base station is configured to:
    send second control information to the terminal device in a second control channel candidate set corresponding to the second control resource set, wherein a sum of a size of the first control channel candidate set and a size of the second control channel candidate set is not greater than a first threshold.

14. The base station system according to claim 13, wherein:
  the first configuration information further comprises first transmission mode information associated with the first control information, and the second configuration information further comprises second transmission mode information associated with the second control information; or
  the first base station is further configured to send third configuration information to the terminal device, wherein the third configuration information comprises first transmission mode information associated with the first control information and second transmission mode information associated with the second control information.

15. The base station system according to claim 14, wherein:
  the first transmission mode information is a transmission mode; or
  the first transmission mode information is one or more of a resource mapping manner, a DMRS scrambling code sequence, and QCL.

16. The base station system according to claim 14, wherein:
  the second transmission mode information is a transmission mode; or
  the second transmission mode information is one or more of a resource mapping manner, a demodulation reference signal (DMRS) scrambling code sequence, and quasi co-location (QCL).

17. The base station system according to claim 13, wherein the first control resource set and the second control resource set belong to different carriers.

* * * * *